(12) United States Patent
Sandrasekaran (10) Patent No.: US 10,203,011 B2
(45) Date of Patent: Feb. 12, 2019

(54) BRAKING ARRANGEMENT AND AN ATTACHMENT MEMBER

(71) Applicant: VOLVO TRUCK CORPORATION, Göteborg (SE)

(72) Inventor: Ramachandran Sandrasekaran, Raman Nagar Bangalore (IN)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/511,212

(22) PCT Filed: Oct. 29, 2015

(86) PCT No.: PCT/EP2015/075146
§ 371 (c)(1),
(2) Date: Mar. 14, 2017

(87) PCT Pub. No.: WO2016/071207
PCT Pub. Date: May 12, 2016

(65) Prior Publication Data
US 2017/0292577 A1    Oct. 12, 2017

(30) Foreign Application Priority Data

Jun. 11, 2014   (IN) ........................... 5597/CHE/2014

(51) Int. Cl.
*F16D 69/04*   (2006.01)
*F16D 51/22*   (2006.01)
(Continued)

(52) U.S. Cl.
CPC ......... *F16D 69/0416* (2013.01); *F16D 51/20* (2013.01); *F16D 51/22* (2013.01);
(Continued)

(58) Field of Classification Search
CPC ................ F16D 69/0416; F16D 51/20; F16D 2069/0433; F16D 2250/0084
See application file for complete search history.

(56) References Cited

U.S. PATENT DOCUMENTS 256,117 A  *  4/1882  Bray
302,648 A  *  7/1884  Bray
(Continued)

FOREIGN PATENT DOCUMENTS

CN     1177067 A     3/1998
CN     1886605 A     12/2006
(Continued)

OTHER PUBLICATIONS

International Search Report (dated Feb. 18, 2016) for corresponding International App. PCT/EP2015/075146.
(Continued)

*Primary Examiner* — Melanie Torres Williams
(74) *Attorney, Agent, or Firm* — WRB-IP LLP (57) ABSTRACT

A braking arrangement includes a brake liner, a backing plate and an attachment member for interconnecting the brake liner to the backing plate, wherein the brake liner includes a recess in a surface facing the backing plate, wherein the backing plate includes a through hole associated to the recess of the brake liner; wherein the attachment member includes a first portion engaging the recess of the brake liner, wherein the attachment member further includes a second portion extending from the first portion of the attachment member and forming a one-piece unit with the first portion, and in that the second portion extends into the through hole of the backing plate and engages with the backing plate. An attachment member and a method for interconnecting a brake liner to a backing plate by an attachment member are also provided.

16 Claims, 7 Drawing Sheets

(51) Int. Cl.
*F16D 65/09* (2006.01)
*F16D 51/20* (2006.01)
*F16D 125/30* (2012.01)

(52) U.S. Cl.
CPC ...... *F16D 65/09* (2013.01); *F16D 2069/0433* (2013.01); *F16D 2125/30* (2013.01); *F16D 2250/0084* (2013.01)

(56) References Cited

U.S. PATENT DOCUMENTS

| | | | |
|---|---|---|---|
| 1,934,448 A | | 11/1933 | Roth |
| 1,951,168 A | * | 3/1934 | Roth .................. F16B 19/10 24/713.7 |
| 2,096,598 A | * | 10/1937 | Sheane ................ F16B 19/04 188/234 |
| 2,541,978 A | * | 2/1951 | Amundsen .......... F16D 69/0416 188/245 |
| 2,541,979 A | * | 2/1951 | Amundsen ........... F16D 65/122 188/245 |
| 2,594,840 A | * | 4/1952 | Allison ................ F16B 19/06 227/54 |
| 4,146,118 A | | 3/1979 | Zankl |
| 2002/0121412 A1 | | 9/2002 | Young |

FOREIGN PATENT DOCUMENTS

| | | |
|---|---|---|
| DE | 2365508 A1 | 6/1975 |
| DE | 2712887 B1 | 4/1978 |
| GB | 690145 | 4/1953 |
| JP | S56167935 A | 12/1918 |
| JP | S57134029 A | 8/1982 |
| JP | H07158673 A | 6/1995 |
| WO | 9827358 A1 | 6/1998 |
| WO | 9914426 A1 | 3/2000 |

OTHER PUBLICATIONS

International Preliminary Report on Patentability (dated Jan. 27, 2017) for corresponding International App. PCT/EP2015/075146.
European Official Action (dated Nov. 27, 2017) for corresponding European App. EP 15 788 383.6.
Chinese Official Action (dated Sep. 19, 2018) for corresponding Chinese App. 201580059501.X.

* cited by examiner

BRAKING ARRANGEMENT AND AN ATTACHMENT MEMBER

BACKGROUND AND SUMMARY

The present invention relates to a braking arrangement. The invention also relates to an attachment member and a corresponding method for interconnecting a brake liner to a backing plate by means of the attachment member. The invention is applicable on vehicles, in particularly heavy duty vehicle such as e.g. trucks or buses. However, although the invention will mainly be described in relation to a truck, the invention is of course also applicable for other type of vehicles using drum brakes, such as e.g. cars or working machines, etc.

In connection to the field of braking arrangements for vehicles, an often used braking arrangement is a drum brake. When the drum brake is activated, i.e. when the vehicle is braking, a brake liner of the drum brake is forced in a radially outward direction of the drum brake where it is abutting a friction material of the vehicle wheel, which thus reduces the speed of the vehicle. Hence, the brake liner of the drum brake is a wearing part which has to be replaced within predetermined time intervals.

The brake liner is often connectable to a backing plate of the drum brake. The interconnection between the brake liner and the backing plate can be made in a number of different fashions. A relatively normal procedure is to interconnect the brake liner to the backing plate by means of a rivet or the like such that a tight and secure fit between the two parts are achieved.

US 2002/0121412 describes a braking arrangement comprising brake lining segments which are connectable to a brake shoe of a drum brake by means of keying element. The braking arrangement in US 2002/0121412 strives to improve the interconnection between the brake lining segments and the brake shoe such as to prevent detachment of the lining segments from the brake shoe during use.

However, the braking arrangement in US 2002/0121412 is still in need of further improvements in terms of e.g. simplified service procedure when exchanging the brake lining segments.

It is desirable to provide a braking arrangement having a brake liner which is simpler to assemble to a backing plate in comparison to the prior art.

According to a first aspect of the invention, there is provided a braking arrangement comprising a brake liner, a backing plate and an attachment member for interconnecting the brake liner to the backing plate, wherein the brake liner comprises a recess in a surface facing the backing plate, wherein the backing plate comprises a through hole associated to the recess of the brake liner; wherein the attachment member comprises a first portion engaging the recess of the brake liner, wherein the attachment member further comprises a second portion extending from the first portion of the attachment member and forming a one-piece unit with the first portion, and wherein the second portion extends into the through hole of the backing plate and engages with the backing plate.

The wording "through hole associated to the recess" should in the following and throughout the entire description be interpreted as the through hole and the recess are arranged in connection to each other such that the attachment member can engage both the brake liner and the backing plate. The through hole can be arranged in alignment with the recess or it can be arranged slightly offset to the recess. Hence, the wording "through hole associated to the recess" should not be construed as limited to an arrangement where the through hole and the recess are arranged in absolute alignment with each other since certain tolerances may be considered acceptable.

Furthermore, the wording "forming a one-piece unit with the first portion" should in the following and throughout the entire description be interpreted as an attachment member where the first and second portions are integrally formed with each other, i.e. the first portion and the second portion are arranged as an integral part.

This braking arrangement creates conditions for a simplified assembly of the attachment member when interconnecting the brake liner to the backing plate, since the use of additional assembly components, such as e.g. screws or bolts, are no longer necessary. In more detail, the second portion of the attachment member is hence used as an attachment means for interconnecting the brake liner to the backing plate. A pressing machine or the like can be used when assembling the components such that a tight fit is achieved.

Advantages of the present invention is thus that a braking arrangement is provided which comprises fewer components in comparison to the prior art. Also, assembly of the braking arrangement is simplified and more time efficient since it does not require any attachment by means of screws or bolts, which attachment methods are time consuming and more difficult to automatize, since it requires a visual determination that the threaded holes of the attachment members are arranged in alignment with the holes of the backing plate. The present invention on the other hand merely needs to position the attachment member in the recess and the through hole; whereby the pressing machine can press the attachment member in place.

According to an example embodiment, the second portion may extend through the through hole of the backing plate and engage with a surface of the backing plate located on an opposite side of the backing plate in relation to the brake liner.

Hereby, the engagement between the second portion and the backing plate is further improved, i.e. the interconnection between the second portion of the attachment member and the surface of the backing plate provides for a connection to a well defined surface which connection further prevents the brake liner to be detached during use of the braking arrangement.

According to an example embodiment, the second portion may engage the surface of the backing plate on opposite sides of the through hole.

An advantage is that a more or less symmetric engagement of the attachment member is provided which efficiently distributes the upcoming force from the braking procedure.

According to an example embodiment, the second portion may comprise a pair of legs. The pair of legs is advantageous since they can be arranged on opposite sides of the above described through hole. Also, the pair of legs is advantageous during assembly, since a pressing machine, having a tapering end portion to press the second portion, will more or less automatically press the legs to opposite sides of the through hole.

According to an example embodiment, each of the legs of the second portion of the attachment member may comprise an end portion having a J-formed flange, wherein the J-formed flanges are facing away from each other.

Hereby, the J-formed flanges will provide for a circumferentially arranged force on the backing plate by means of the leg portion, as well as a support in the radial direction of the braking arrangement by means of the J-formed flanges.

According to an example embodiment, the recess may be elongated and extend in an axial direction of the brake liner from an axial end portion of the brake liner towards a center portion thereof. An advantage is that the braking arrangement is further improved in relation to an assembly perspective, whereby the attachment member can be provided to the brake liner and the backing plate from a side portion thereof and thereafter pressed to provide the final braking arrangement. Having access to the recess of the brake liner from an axial end portion of the braking arrangement is advantageous since the attachment member will be easily accessible during service of the braking arrangement.

According to an example embodiment, the brake liner may comprise a plurality of circumferentially spaced recesses. Hereby, the interconnection between the brake liner and the backing plate is further secured. According to an example embodiment, the backing plate may comprise a plurality of circumferentially spaced through holes associated to the recesses.

According to an example embodiment, the first portion of the attachment member may comprise a dovetail shaped portion. The dovetail shaped portion prevents the attachment member from moving in the radial direction of the braking arrangement.

According to an example embodiment, the recess of the brake liner may comprise a dovetail shaped portion. Hereby, the dimensions of the dovetail shaped portion of the attachment member may correspond to the dovetail shape of the recess for providing an improved fit there between. However, providing a dovetail shaped recess does not have to imply that also the first portion of the attachment member comprises a dovetailed shaped portion.

According to an example embodiment, the recess of the brake liner may be formed as a through hole having a protruding portion at a side of the brake liner facing the backing plate.

According to an example embodiment, the through hole may be positioned at a predetermined non-zero distance from an axial end portion of the brake liner.

According to a second aspect of the present invention, there is provided a braking arrangement comprising a brake liner, a backing plate and an attachment member for interconnecting the brake liner to the backing plate, wherein the brake liner comprises a recess in a surface facing the backing plate, wherein the backing plate comprises a through hole associated to the recess of the brake liner; wherein the attachment member comprises a first portion engaging the recess of the brake liner, wherein the attachment member further comprises a second portion extending from the first portion of the attachment member, wherein the second portion comprises a pair of legs extending into the through hole of the backing plate and engages with the backing plate.

An advantage of the second aspect of the present invention is that the attachment member can be made in a two-piece configuration, i.e. as two separate components which are interconnected to each other by means of a e.g. a screw, a bolt, etc. Hereby, the first portion can engage the recess of the brake liner and the second portion can engage the through hole, where after the first and second portions of the attachment members are interconnected to each other.

Further effects and features of this second aspect of the present invention are largely analogous to those described above in relation to the first aspect of the present invention.

According to a third aspect of the present invention, there is provided an attachment member configured to interconnect a brake liner to a backing plate, wherein the attachment member comprises a first portion configured to engage a recess of the brake liner, wherein the attachment member further comprises a second portion extending from the first portion and forming a one-piece unit with the first portion, wherein said second portion is configured to extend into a through hole of the backing plate and engage with the backing plate when the attachment member interconnects the brake liner to the backing plate.

Hereby, an attachment member is provided which is arranged in such a way as to provide for a simplified interconnection between the brake liner and the backing plate.

According to an example embodiment, the second portion may be configured to extend through the through hole of the backing plate and engage with a surface of the backing plate located on an opposite side of the backing plate in relation to the brake liner.

According to an example embodiment, the second portion may comprise a pair of legs.

According to an example embodiment, each of the legs of the second portion may be configured to be formed in a J-formed flange when the attachment member interconnects the brake liner to the backing plate, wherein the J-formed flanges are configured to face away from each other.

According to an example embodiment, the first portion may comprise a dovetail shaped portion.

According to an example embodiment, the first portion may comprise a protruding portion extending from outer end portions of the dovetail shaped portion towards a longitudinal center plane of the attachment member and in a direction away from the extension of the second portion.

An advantage is that the protruding portion may be designed such that it, when the brake liner interconnects with the backing plate, is arranged in abutment with an inner portion of the recess, providing a tight fit between the first portion of the attachment member and the recess of the brake liner.

According to an example embodiment, the second portion may be configured to be deformed from a first, non-operative state, to a second, operative state, in which the second portion engages with the backing plate. Hereby, the second portion is deformable such that the attachment member will engage with the backing plate.

According to an example embodiment, the legs may be arranged in a first mutual position in the first, non-operative state, and configured to be arranged in a second mutual position in the second, operative state, wherein the legs are configured to be arranged in a diverging mutual position in the second, operative state.

Further effects and features of the third aspect of the present invention are largely analogous to those described above in relation to the first and second aspects of the present invention.

According to a fourth aspect of the present invention, there is provided an attachment member configured to interconnect a brake liner to a backing plate, wherein the attachment member comprises a first portion configured to engage a recess of the brake liner, wherein the attachment member further comprises a second portion extending from the first portion, wherein the second portion comprises a pair of legs configured to extend into a through hole of the backing plate and engage with the backing plate when the attachment member interconnects the brake liner to the backing plate.

According to an example embodiment, the pair of legs may form a one-piece unit with the first portion.

Effects and features of the fourth aspect are largely analogous to those described above in relation to the first, second and third aspects of the present invention.

According to a fifth aspect of the present invention, there is provided a drum brake comprising a pair of brake shoes, which are movably arranged in relation to each other in a radial direction of the drum brake and a braking arrangement according to any one of the above described example embodiments, wherein the backing plate is attached to one of the brake shoes.

Effects and features of the fifth aspect of the present invention are largely analogous to those described above in relation to the first, second, third and fourth aspects of the present invention.

According to a sixth aspect of the present invention, there is provided a vehicle comprising a braking arrangement according to any one of the above described example embodiments in relation to the first aspect of the present invention, or a drum brake according to the above described fifth aspect of the present invention.

Effects and features of the sixth aspect of the present invention are largely analogous to those described above in relation to the first, second, third, fourth and fifth aspects of the present invention.

According to a seventh aspect of the present invention, there is provided a method for interconnecting a brake liner to a backing plate by means of an attachment member, the method comprising the steps of positioning the brake liner on an outer surface of the backing plate such that a recess of the brake liner is associated with a through hole of the backing plate; providing the attachment member to the brake liner and the backing plate such that a first portion of the attachment member is positioned in the recess of the brake liner and a second portion of the attachment member, extending from the first portion and forming a one-piece unit with the first portion, is positioned in the through hole of the backing plate; and pressing the second portion in a direction towards the brake liner for engaging the second portion with the backing plate.

Hereby, a method is provided which simplifies the interconnection between the brake liner and the backing plate. Hence, when the brake liner is worn out, switching to a new brake liner is made in a time efficient and secure manner. According to an example embodiment, the attachment member may be provided to the brake liner and thereafter provided to the backing plate.

According to an example embodiment, the step of providing the attachment member to the brake liner and the backing plate may be executed by means of directing the attachment member from an axial end portion of the backing plate towards a center portion thereof.

Further effects and features of the seventh aspect of the present invention are largely analogous to those described above in relation to the other aspects of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAIL DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
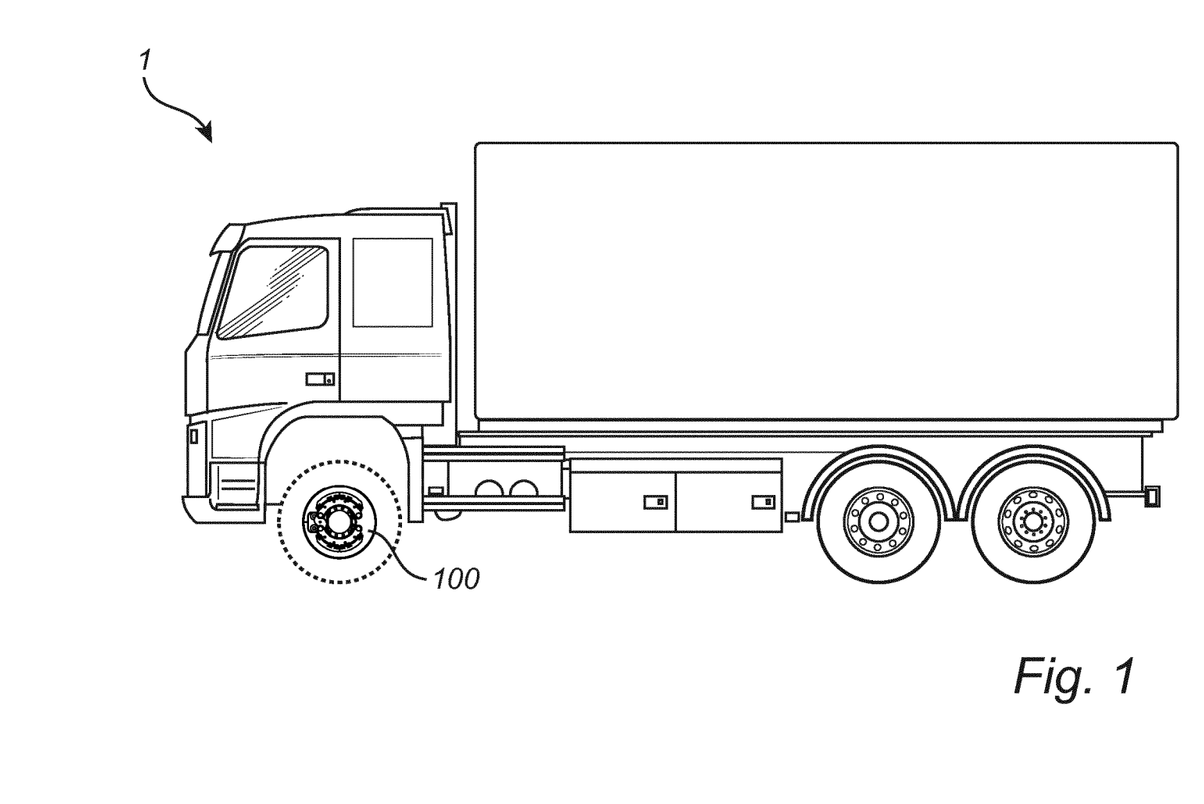
FIG. 1 is a side view of a heavy duty vehicle, in the form of a truck, provided with a braking arrangement according to an example embodiment of the present invention.

With particular reference to FIG. 1, there is provided a vehicle 1 comprises a braking arrangement 100 according to an example embodiment of the present invention. The vehicle 1 depicted in FIG. 1 is a heavy duty vehicle, here in the form of a truck, for which the inventive braking arrangement 100, which will be described further below, is particularly suitable for.

Figure 2:
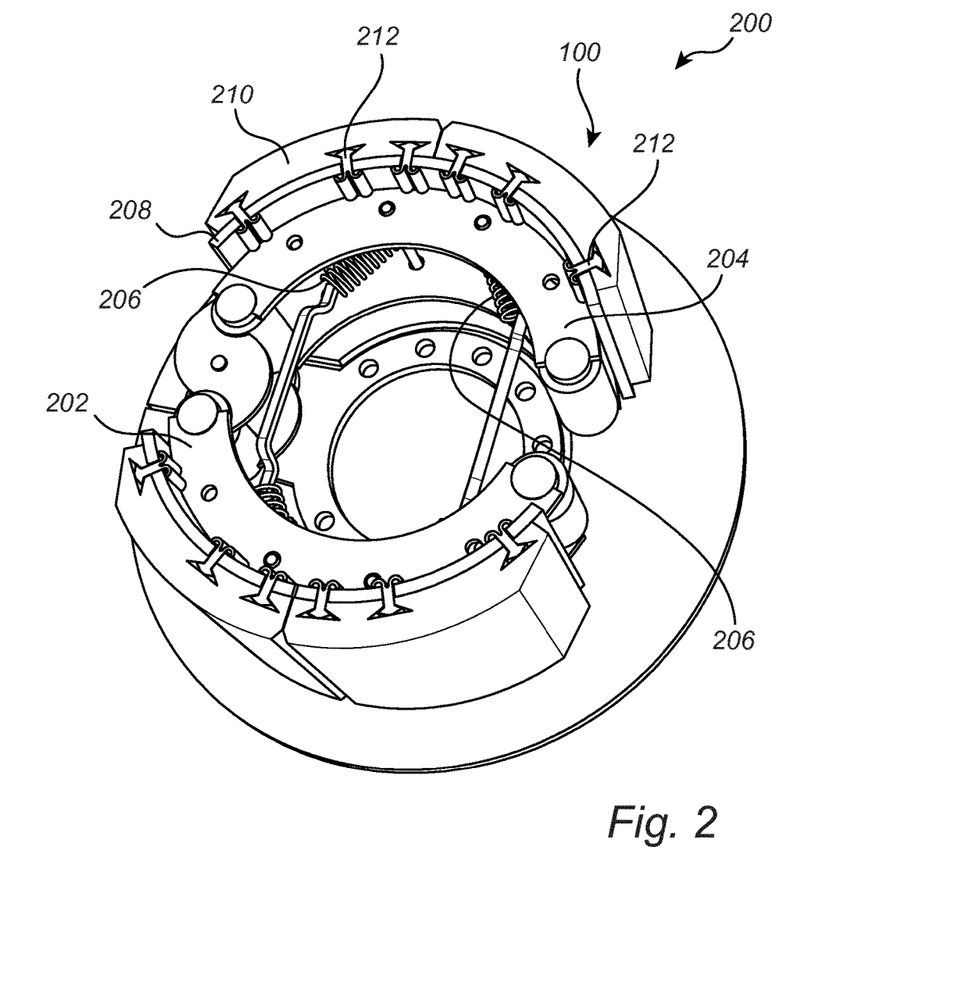
FIG. 2 is a perspective view of the braking arrangement in an assembled configuration according to an example embodiment of the present invention.

Turning to FIG. 2, there is provided a perspective view of a braking arrangement 100 in an assembled configuration according to an example embodiment of the present invention. More specifically, FIG. 2 depicts a portion of a drum brake 200 which comprises the braking arrangement 100 according to an example embodiment of the present invention. The drum brake 200 comprises a pair of brake shoes 202, 204 which are connected to each other as well as to a brake actuating arrangement (not shown) by means of springs 206. Further, the brake shoe 202 is associated with, and comprises, a backing plate 208. The backing plate 208 is configured to be a support for the wearing part of the drum brake 200, namely the brake liner 210. In detail, the brake liner 210 is connected to the backing plate 208 by means of a plurality of attachment members 212. A further description of the backing plate, brake liner and attachment members will be given below in relation to e.g. FIGS. 3-6.

When the drum brake 200 is activated, i.e. when the brakes are applied for reducing the vehicle speed, the brake actuating arrangement forces the brake shoes 202, 204 with the backing plate 208, attachment members 212 and brake liner 210 in the radial direction of the drum brake 200. The brake liner 210 is thus forced in the radial direction of the drum brake 200 and will eventually get in contact with a friction element (not shown) of the vehicle wheel such that a relative motion between the drum brake and the vehicle wheel is reduced. When the drum brake is deactivated, the springs 206 will bring the braking shoe to their non-braking position.

Since the brake liner 210, during activation of the drum brake, is forced in contact with the friction element of the vehicle wheel, the brake liner 210 will be more and more worn down, i.e. the material thickness of the brake liner 210 will be slightly reduced for each time the drum brake 200 is activated. Eventually, the brake liner 210 needs to be replaced with a new brake liner in order for the drum brake 200 to achieve proper braking functionality for the vehicle.

Figure 3:
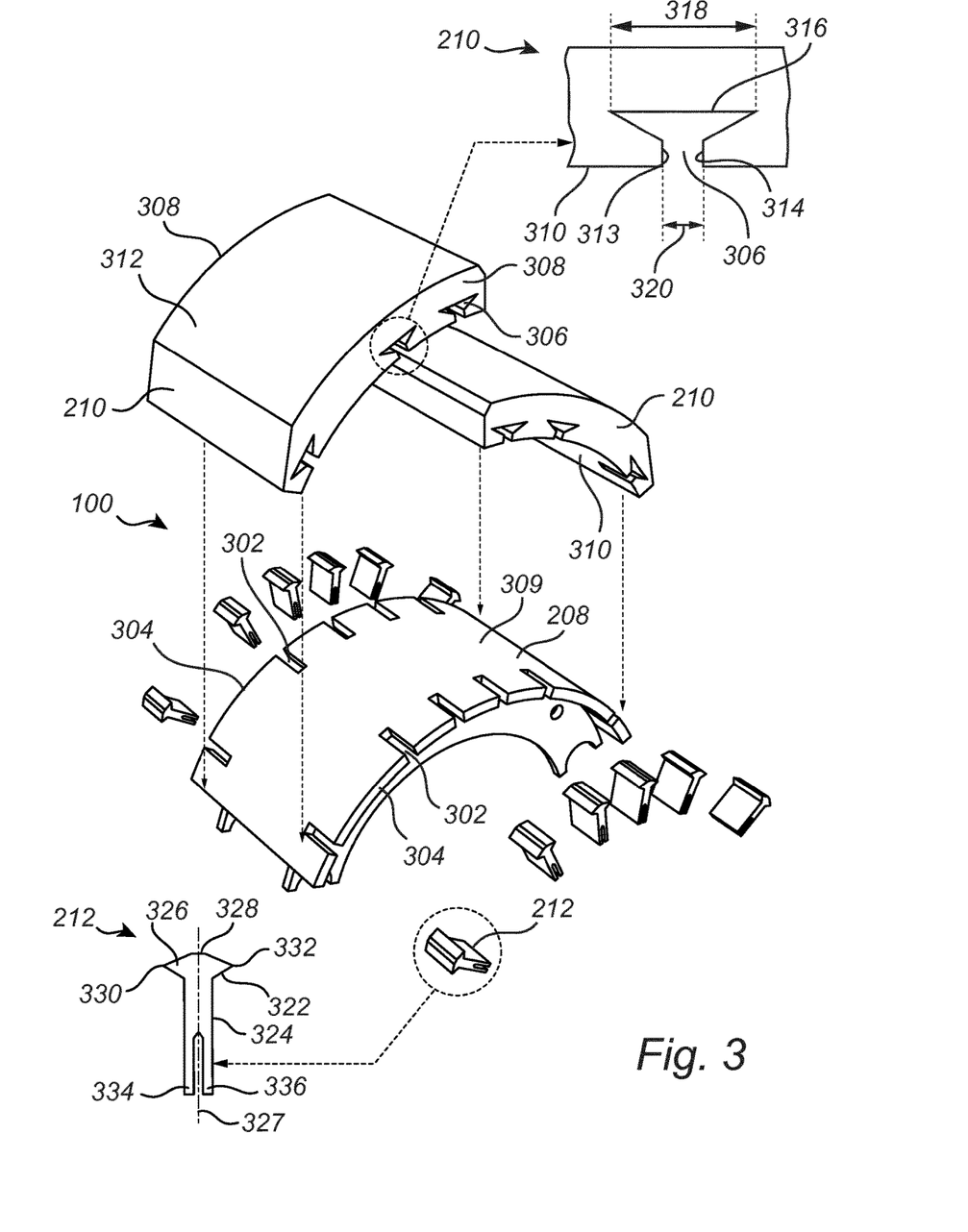
FIG. 3 is an exploded perspective view illustrating the components of the braking arrangement according to an example embodiment of the present invention.

Reference is therefore made to FIG. 3 which illustrates an exploded view of the braking arrangement in FIG. 2, as well as detailed views of a cross-section of the above described attachment member 212 and the brake liner 210. The braking arrangement 100 depicted in FIG. 3 comprises the backing plate 208, the brake liner 210 and the attachment members 212 before the braking arrangement 100 is assembled in its final configuration.

Firstly, the backing plate 208 comprises a plurality of through holes 302. The through holes 302 are arranged as elongated through holes which are extending axially from an axial end portion 304 towards a center portion of the backing plate 208. More specifically, the through holes 302 are open in the axial direction of the backing plate at the axial end portion 304. As depicted in FIG. 3, the through holes 302 are arranged on each axial end portion 304 of the backing plate 208. Although the elongated through holes depicted in FIG. 3 extends purely in the axial direction of the backing plate 208, the through hole may equally as well have a circumferential component such that the elongated through hole extend in an axial direction of the backing plate as well as a circumferential direction thereof.

Turning now to the brake liner 210 depicted in FIG. 3, which is the wear part of the braking arrangement 100. A cut-out portion of the brake liner 210 is depicted in FIG. 3 for a further detailed illustration thereof. The brake liner 210 comprises a plurality of recesses 306 which, in the example embodiment depicted in FIG. 3, are arranged as elongated recesses extending from an axial end portion 308 of the brake liner 210 towards a center portion thereof. More specifically, the recesses 306 are open in the axial direction of the brake liner 210 at the axial end portion 308. The recesses 306 are provided as non-through holes and arranged on a surface 310 facing the backing plate 208 when the braking arrangement is assembled. By means of a recess in the form of a non-through hole, the braking area of the surface 312 facing away from the backing plate 208 is increased in relation to through holes arranged in the brake liner 210. Furthermore, the recesses 306 are arranged on each axial end portion 308 of the brake liner 210 and distributed in the circumferential direction of the brake liner 210 at intervals corresponding to the circumferential distribution of the through holes 302 of the backing plate 208. Hence, the through holes 302 of the backing plate 208 are associated with the recesses 306 of the brake liner 210 such that, when the braking arrangement 100 is assembled, each of the recesses 306 of the brake liner 210 more or less coincides with a respective through hole 302 of the backing plate 208.

In order to describe the recess 306 of the brake liner 210 in further detail, reference is made to the cut-out portion depicted in FIG. 3. The recess 306 of the brake liner 210 is, as described above, formed as a non-through hole which comprises a first 313 and a second 314 side wall and a bottom recess wall 316. Furthermore, the recess 306 is formed as a dovetail shape which means that a width 318 of the recess 306 facing away from the backing plate 208 is larger than a width 320 of the recess 306 facing the backing plate 208. The advantages of forming the recess 306 in a dovetail shape will be described further below in relation to the description of the attachment member 212 depicted in FIG. 3.

The attachment member 212, which cross-section according to an example embodiment of the present invention is depicted in further detail in FIG. 3, will now be described. The attachment member 212 comprises a first portion 322 and a second portion 324. The first 322 and the second 324 portions of the attachment member 212 are formed as a one-piece unit, i.e. the first 322 and the second 324 portions form an integral part of the attachment member 212. The first portion 322 of the attachment member 212 is configured to be directed into the recess 306 of the brake liner 210 during assembly thereof, while the second portion 324 is configured to extend into the through hole 302 of the backing plate 208. The second portion 324 of the exemplified attachment member 212 depicted in FIG. 3 is further configured to extend into and through the through hole 302 of the backing plate 208. A detailed description of the assembly method will be given below in relation to FIGS. 4a-4c and FIG. 8.

The first portion 322 of the attachment member 212 comprises a dovetail shaped portion 326. The dovetail shaped portion 326 is advantageous since it, when the first portion 322 of the attachment member 212 is directed into dovetail shaped recess 306 of the brake liner 210, has a shape that correspond to the dovetail shape of the recess. Hereby, a tight fit between the attachment member 212 and the brake liner 210 is provided. In detail, the attachment member 212 is, by means of the dovetail shape 326, prevented from being moved in the radial direction of the braking arrangement 100. Furthermore, the first portion of the attachment member 212 comprises a protruding portion 328. The protruding portion 328 extends from outer end portions 330, 332 of the dovetail shaped portion 326 and in a direction away from the second portion 324 of the attachment member 212. An advantage with the protruding portion 328 is that, when the first portion 322 of the attachment member 212 is provided into the recess 306 of the brake liner 210, the fit between the first portion 322 and the recess 306 can be further improved by means of the connection between the protruding portion 328 and the bottom recess wall 316 of the recess.

Moreover, the second portion 324 of the attachment member 212 comprises a pair of legs 334, 336. The pair of legs 334, 336 extends in a direction away from the first portion 322 of the attachment member 212 and is arranged approximately in parallel with each other. The invention is thus not limited to parallel legs; the legs 334, 336 may equally as well be inclined in relation to each other. The pair of legs 334, 336 will, when the braking arrangement 100 is assembled, be formed in a J-shaped form, which will be illustrated and described in further detail below. It should be noted that the present invention should not be limited to any particular size and shape of the pair of legs 334, 336. These parameters are of course depending on the specific application of the braking arrangement, e.g. the size of the drum brake, the number of attachment member used, etc.

Figure 4A:
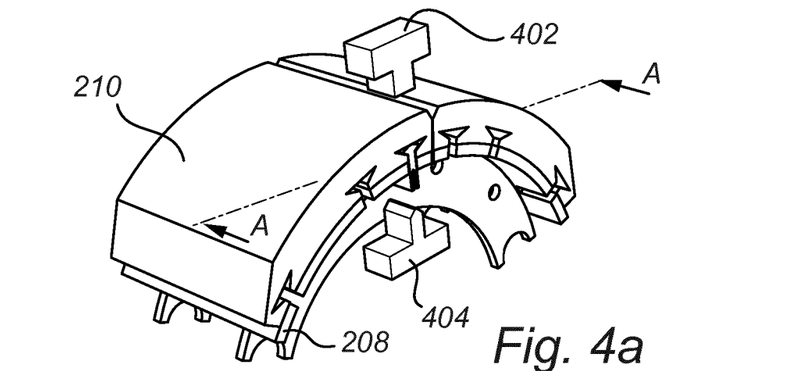
FIGS. 4a-4c illustrate the braking arrangement during assembly thereof according to an example embodiment of the present invention.
Figure 4B:
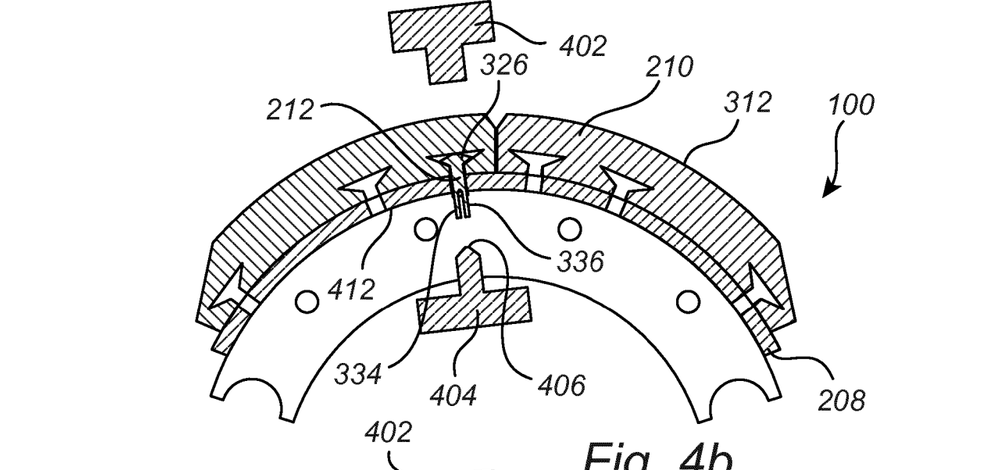
Figure 4C:
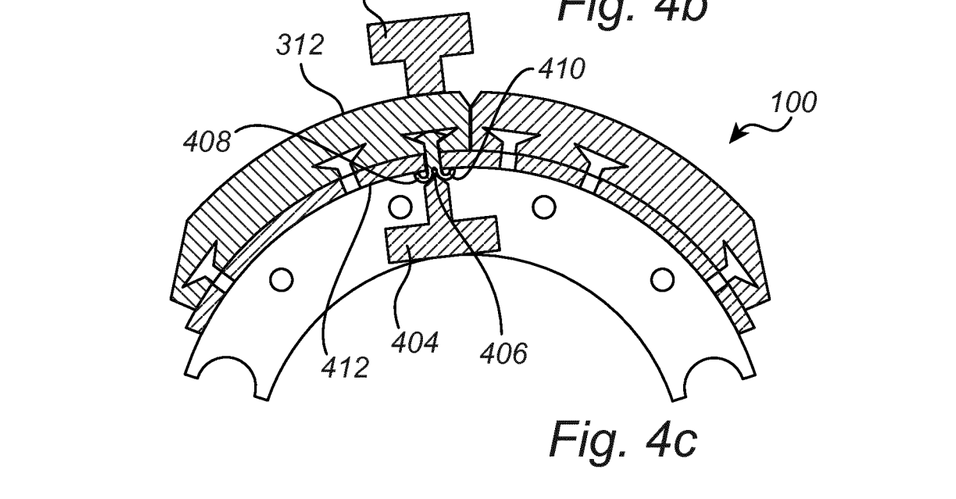

Reference is now made to FIGS. 4a-4c, which illustrate the method for assembling the braking arrangement, or more precisely, the method of interconnecting the brake liner 210 to the backing plate 208 by means of the attachment member 212.

FIG. 4a illustrates the braking arrangement 100 before final assembly thereof. A detailed side view of the braking arrangement 100 before assembly thereof is depicted in FIG. 4b. Attention is therefore drawn to FIG. 4b, which illustrates the attachment member 212 in position before the brake liner 210 is fully connected to the brake liner 208. As can be seen in FIG. 4b, the first portion 322 of the attachment member 212 is positioned in the recess 306 of the backing plate 210 such that the dovetail shaped portion 326 of the attachment member 212 is positioned in the dovetail shaped portion of the recess 306. The second portion 324 of the attachment member 212 is extending through the backing plate 208 such that the pair of legs 334, 336 is directed out from the backing plate 208. The braking arrangement is now ready to be assembled and is provided into an assembly arrangement, in FIG. 4a illustrated as an arrangement having a top anvil 402 which is configured to be in abutment with the surface 312 of the brake liner 210 facing away from the backing plate 208, and a bottom press 404 having a tapering end portion 406 facing a surface 412 of the backing plate 208 facing away from the brake liner 210.

During assembly of the braking arrangement 100, i.e. when interconnecting the brake liner 210 with the backing plate 208 by means of the attachment member 212, the top anvil 402 is arranged in abutment with the surface 312 of the brake liner 210 facing away from the backing plate 208. The bottom press 404 is provided from a non-engaging state, as illustrated in FIG. 4b, to an engaging state, as illustrated in FIG. 4c. The bottom press 404 is thus, during assembly, provided in a radially outward direction towards the attachment member 212. As further illustrated in FIG. 4c, the tapering end portion 406 of the bottom press 404 has been directed into the area between the pair of legs 334, 336 such that each of the pair of legs 334, 336 has formed a J-formed flange 408, 410. Hence, the tapering end portion 406 of the bottom press 404 forces the pair of legs 334, 336 towards a respective side of the opening 302 of the backing plate 208 such that the J-formed flanges 408, 410 are arranged in abutment with the surface 412 of the backing plate 208 facing away from the brake liner 210. Hereby, the brake liner 210 is securely and tightly fixated to the backing plate 208.

Figure 5:
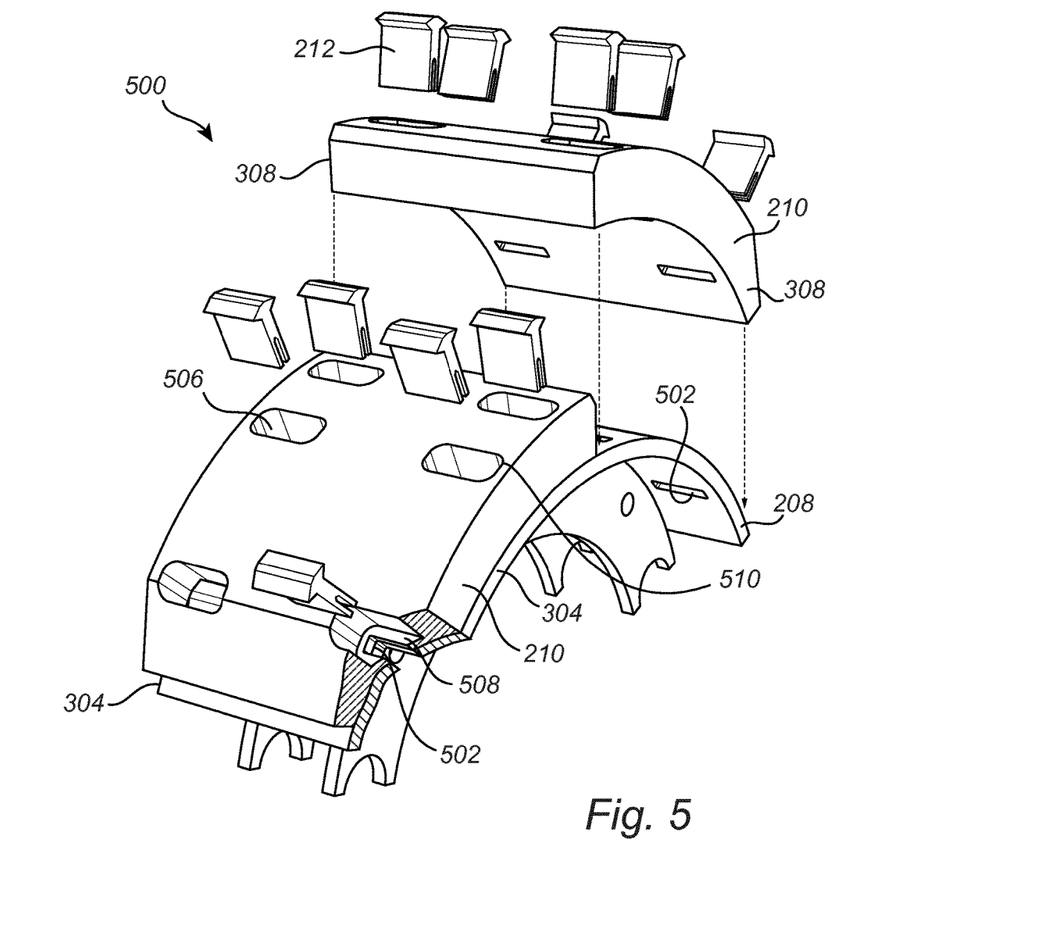
FIG. 5 is an exploded perspective view illustrating the components of the braking arrangement according to a further example embodiment of the present invention.

Turning to FIG. 5, which is an exploded perspective view illustrating the components of the braking arrangement 500 according to a further example embodiment of the present invention. As can be seen, the recesses of the brake liner are formed as elongated through holes 506. The elongated through holes 506 are provided at a distance from the axial end portions 308 of the brake liner 210, i.e. the elongated through holes 506 are arranged at a non-zero distance from the axial end portions 308, on a respective side thereof, of the brake liner 210. Furthermore, the elongated through holes 506 are circumferentially spaced from each other and comprises a protruding portion 508 at a side of the through hole facing the backing plate 208. The protruding portion 508 can be designed differently but should imply that the area of the opening facing the backing plate 208 is smaller than the area of the opening facing away from the backing plate 208. The backing plate 208 also comprises through holes 502 arranged at a non-zero distance from a respective axial end portion 304 of the backing plate 208. The through holes of the backing plate 208 are also circumferentially spaced from each other and at intervals corresponding to the intervals of the circumferentially arranged through holes 506 of the brake liner 210. Hence, the through holes 506 of the brake liner 210 are associated with the through holes 502 of the backing plate 208.

Moreover, the braking arrangement 500 depicted in FIG. 5 also comprises an attachment member 212. The attachment member 212 can be designed as the attachment member 212 depicted in FIGS. 2-4c, or it can be provided with a rounded first portion (not shown) which corresponds to the rounded edges 510 of the through holes. In an assembled configuration, the dovetail shape of the attachment member 212 will be in abutment with the protruding portion 508 of the brake liner 210. It should be readily understood that the first portion 322 of the attachment member 212 does not necessarily have to have a dovetail shaped portion 326. The dovetail shaped portion 326 may equally as well be formed as a T-shaped portion, or the like.

When assembling the braking arrangement 500 depicted in FIG. 5, the attachment members 212 are provided through the through holes 506 of the brake liner 210 and further through the through holes 502 of the backing plate 208. In detail, the attachment members 212 are provided into the through holes 506 of the brake liner 210 from a side of the brake liner 210 facing away from the backing plate 208. Hereby, the dovetail shaped portion 326 of the attachment member 212 will be in abutment with the protruding portion 508 of the through hole 506. The second portion 324 of the attachment member will extend through the through hole in a similar manner as depicted in FIG. 4b. Thereafter, the braking arrangement 500 is assembled as described above in relation to FIG. 4c.

Figure 6:
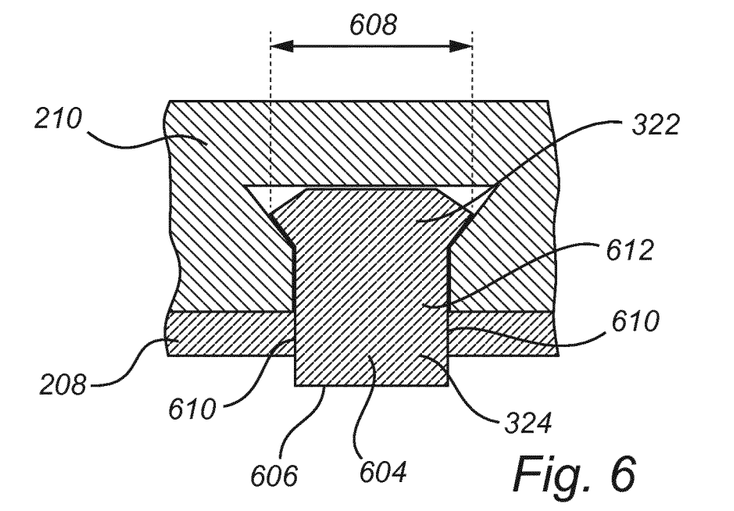
FIG. 6 is a cut-out side view of a braking arrangement comprising an attachment member according to a further example embodiment of the present invention.

Although the above description has been related to an attachment member 212 with a second portion 324 comprising a pair of legs 334, 336, other configurations of the attachment member are also conceivable. Reference is therefore made to FIG. 6 which illustrates another example embodiment of an attachment member 612 according to the present invention. The first portion 322 of the attachment member 612 is similar to the first portion of the attachment member 212 depicted and described above in relation to FIGS. 2-5 and will therefore not be described further. The second portion 324 on the other hand comprises a solid portion 604 instead of the above described pair of legs 334, 336. The solid portion 604 of the second portion 324 extends in a direction away from the first portion 322 of the attachment member 612. During assembly of the braking arrangement 100, 500, a bottom press 404 and a top anvil 402, as described above in relation to FIGS. 4a-4c, can be used. When the bottom press 404 is pressed on the bottom side 606 of the solid portion 604, the solid portion 604 will be compressed in such a way that it will expand in the circumferential direction 608 of the braking arrangement 100, 500. Hereby, a side portion 610 of the solid portion 604 will be press-fitted in the through hole 302, 502 of the backing plate to thereby form an assembled configuration of the braking arrangement 100, 500.

Figure 7:
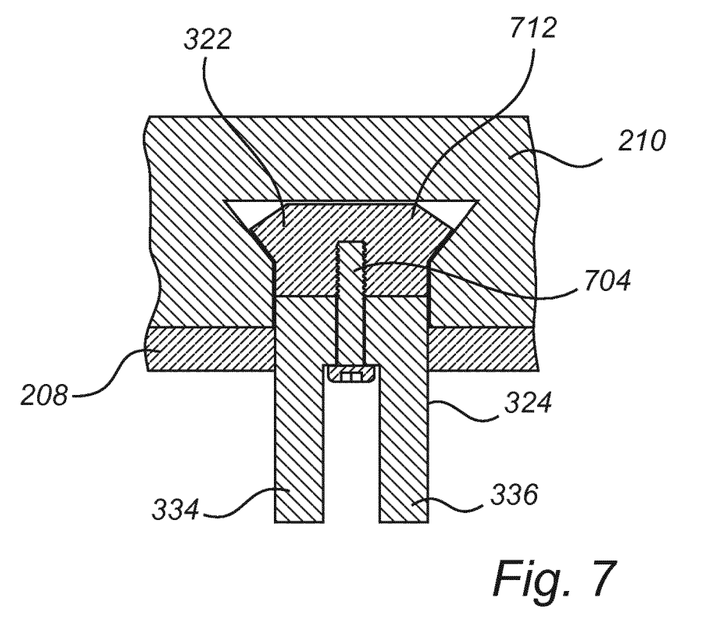
FIG. 7 is a cut-out side view of a braking arrangement comprising an attachment member according to a still further example embodiment of the present invention.

In order to describe a still further example embodiment of the attachment member 712 according to the present invention, reference is made to FIG. 7. The attachment member 712 depicted in FIG. 7 comprises a first 322 and a second 324 portion. The second portion 324 comprises a pair of legs 334, 336 extending in a direction away from the first portion 322 of the attachment member 712. The major difference between the embodiment depicted in FIG. 7 and the embodiment depicted in FIGS. 2-5 is that the first and second portions of the attachment member in FIG. 7 is not arranged as an integral part with each other, i.e. they are formed by two separate portions. The first 322 and the second 324 portions are interconnected to each other by means of a joint member 704, here in the form of a screw. The joint member may however be a suitable means for interconnecting the first portion 322 with the second portion 324, such as e.g. a bolt or glue, etc. The screw in the example depicted in FIG. 7 is extending from the second portion and in to the first portion. The screw may however be provided to the attachment member in the opposite direction as well, i.e. in a direction from the first portion and into the second portion.

Figure 8:
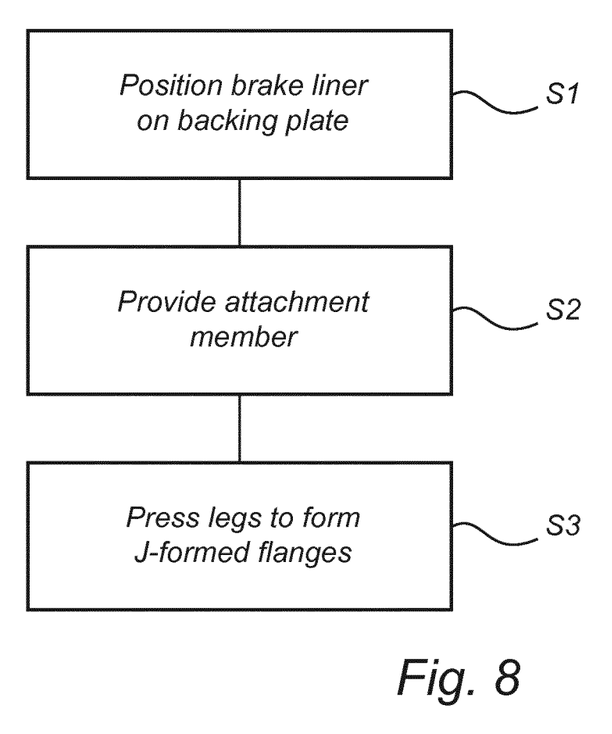
FIG. 8 is a flow chart illustrating an example embodiment of a method for interconnecting a brake liner to a backing plate by means of an attachment member.

Now, reference is made to FIG. 8, in combination with FIGS. 3, 4a-4c, in order to further describe the method for interconnecting the brake liner to the backing plate by means of the attachment member. Firstly, the brake liner 210 is positioned S1 on the backing plate. More specifically, the brake liner 210 is positioned on an outer surface of the backing plate 208, wherein the outer surface should be interpreted as a radially outward facing surface of the backing plate 208. The brake liner 210 should be positioned on the backing plate 208 in such a way that the recesses 306 of the brake liner 210 are associated with the through holes 302 of the backing plate 208. Thereafter, the attachment members 212 are provided S2 to the brake liner 210 and the backing plate 208 such that the first portion 322 of the attachment members 212 are positioned in the recess 306 of the brake liner 210 and the second portion 324 of the attachment members 212 are positioned through the through holes 302 of the backing plate 208. For the braking arrangement depicted in e.g. FIG. 3, the attachment members 212 are provided into the respective recess 306 and through hole 302 from the axial end portions 304, 308 of the brake liner 210 and the backing plate 208. Finally, when the attachment members 212 are positioned, the second portion 324 of the attachment members 212 are pressed S3 in a direction towards the brake liner. Hereby, the second portion 324 of the attachment members 212 engages with the backing plate 208. More specifically, the pair of legs 334, 336 is, by means of a pressing tool, formed in J-formed flanges which engage with the surface 412 of the backing plate facing away from the brake liner 210.

The method for assembling the braking arrangement 500 depicted in FIG. 5 differs mainly from the above described method in that the attachment members 212 are provided to the brake liner 210 and the backing plate 208 radially, i.e. from a side of the brake liner 210 facing away from the backing plate 208 instead of being provided from an axial end portion of the brake liner and backing plate.

It is to be understood that the present invention is not limited to the embodiments described above and illustrated in the drawings; rather, the skilled person will recognize that many changes and modifications may be made within the scope of the appended claims.

The invention claimed is:

1. A braking arrangement comprising a brake liner, a backing plate and an attachment member for interconnecting the brake liner to the backing plate, wherein the brake liner comprises a recess in a surface facing the backing plate, wherein the backing plate comprises a through hole associated to the recess of the brake liner; wherein the attachment member comprises a first portion engaging the recess of the brake liner, wherein the attachment member further comprises a second portion extending from the first portion of the attachment member and forming a one-piece unit with the first portion, and wherein the second portion extends into the through hole of the backing plate and engages with the backing plate, wherein the recess is elongated and extends in an axial direction of the brake liner from an axial end portion of the brake liner towards a center portion thereof, and wherein the through hole is arranged as an elongated through hole extending axially from an axial end portion of the backing plate toward a center portion thereof.

2. The braking arrangement according to claim 1, wherein the second portion extends through the through hole of the backing plate and engages with a surface of the backing plate located on an opposite side of the backing plate in relation to the brake liner.

3. The braking arrangement according to claim 1, wherein the second portion engages the surface of the backing plate on opposite sides of the through hole.

4. The braking arrangement according to claim 1, wherein the second portion comprises a pair of legs.

5. A braking arrangement comprising a brake liner, a backing plate and an attachment member for interconnecting the brake liner to the backing plate, wherein the brake liner comprises a recess in a surface facing the backing plate, wherein the backing plate comprises a through hole associated to the recess of the brake liner; wherein the attachment member comprises a first portion engaging the recess of the brake liner, wherein the attachment member further comprises a second portion extending from the first portion of the attachment member, wherein the second portion comprises a pair of legs extending into the through hole of the backing plate and engages with the backing plate wherein the recess is elongated and extends in an axial direction of the brake liner from an axial end portion of the brake liner towards a center portion thereof, wherein the through hole is arranged as an elongated through hole extending axially from an axial end portion of the backing plate toward a center portion thereof.

6. The braking arrangement according to claim 5, wherein the pair of legs extends through the through hole of the backing plate and engages with a surface of the backing plate on an opposite side of the backing plate in relation to the brake liner.

7. The braking arrangement according to claim 5, wherein the pair of legs is configured to engage a surface of the backing plate on opposite sides of the through hole.

8. The braking arrangement according to claim 5, wherein the pair of legs is forming a one-piece unit with the first portion.

9. The braking arrangement according to claim 5, wherein each of the legs of the second portion of the attachment member comprises an end portion having a J-formed flange, the J-formed flanges are facing away from each other.

10. The braking arrangement according to claim 5, wherein the brake liner comprises a plurality of circumferentially spaced recesses.

11. The braking arrangement according to claim 10, wherein the backing plate comprises a plurality of circumferentially spaced through holes associated to the recesses.

12. The braking arrangement according to claim 5, wherein the first portion of the attachment member comprises a dovetail shaped portion.

13. The braking arrangement according to claim 5, wherein the recess of the brake liner comprises a dovetail shaped portion.

14. A drum brake comprising a pair of brake shoes, which are movably arranged in relation to each other in a radial direction of the drum brake and a braking arrangement according to claim 1, wherein the backing plate is attached to one of the brake shoes.

15. A vehicle comprising a braking arrangement according to claim 1.

16. A method for interconnecting a brake liner to a backing plate by an attachment member, the method comprising:

positioning the brake liner on an outer surface of the backing plate such that a recess of the brake liner is associated with a through hole of the backing plate;

providing the attachment member to the brake liner and the backing plate by directing the attachment member from an axial end portion of the backing plate towards a center portion thereof, such that a first portion of the attachment member is positioned in the recess of the brake liner and a second portion of the attachment member, extending from the first portion and forming a one-piece unit with the first portion, is positioned in the through hole of the backing plate; and     pressing the second portion in a direction towards the brake liner for engaging the second portion with the backing plate.

\* \* \* \* \*